United States Patent [19]

Ogata et al.

[11] Patent Number: 5,000,589
[45] Date of Patent: Mar. 19, 1991

[54] BEARING STRUCTURES FOR MOTORS

[75] Inventors: Masaaki Ogata; Masayuki Tsuzuku, both of Komagane, Japan

[73] Assignee: Kabushiki Kaisha Sankyo Seiki Seisakusho, Nagano, Japan

[21] Appl. No.: 374,471

[22] Filed: Jun. 30, 1989

[51] Int. Cl.⁵ .............................................. F16C 19/10
[52] U.S. Cl. ..................................... 384/611; 384/517
[58] Field of Search ............... 384/611, 517, 518, 563, 384/535, 581

[56] References Cited

U.S. PATENT DOCUMENTS

| | | | |
|---|---|---|---|
| 2,953,417 | 9/1960 | Horberg | 384/517 |
| 3,804,562 | 4/1974 | Hansson | 384/517 |
| 4,724,943 | 2/1988 | Harrington et al. | 384/611 |

Primary Examiner—Lenard A. Footland
Attorney, Agent, or Firm—Wallenstein, Wagner & Hattis, Ltd.

[57] ABSTRACT

A bearing structure for motors is provided, wherein a rotary shaft is supported by a pair of rolling bearings for rotation with respect to a housing, said rotary shaft being mounted on said pair of rolling bearings for slidable movement in the axial direction thereof.

5 Claims, 4 Drawing Sheets

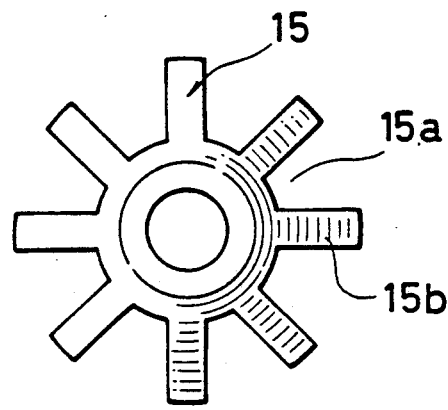
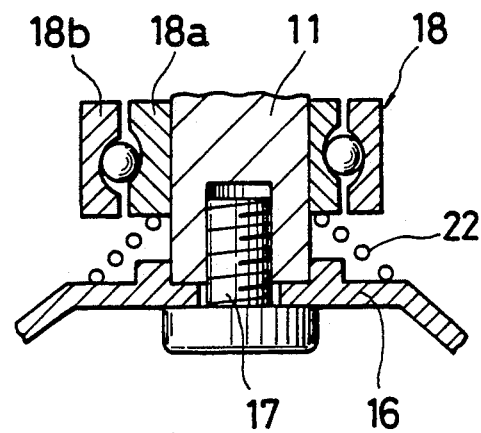
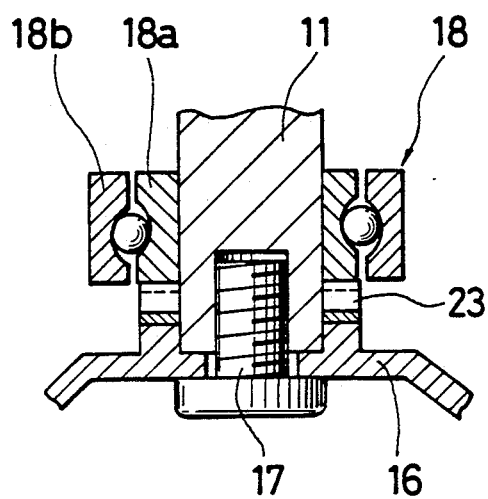

BEARING STRUCTURES FOR MOTORS

BACKGROUND OF THE INVENTION

1. Field of the Invention

The present invention relates to a bearing structure for motors in which rolling bearings are used.

2. Statement of the Prior Art

Where it is required to accurately position a spindle that is an output shaft of a motor in a thrust direction and rotatably support said spindle while preventing its rattling, as encountered in the case of, e.g., a direct drive system for disks that are recording media for information carrying signals, the spindle is supported by rolling bearings, while the rolling bearings are biased by a spring in the thrust direction to apply a pilot pressure thereto.

Typically, FIGS. 8 and 9 show two conventional bearing structures for motors in which a pilot pressure is applied in the thrust direction of rolling bearings.

Referring to FIG. 8, a spindle hub 1a is fixed to an upper end of a spindle 1 that is an output shaft of a motor, and inner rings of two rolling bearings 2 and 2 are fixed around upper and lower portions of the spindle 1 with a sleeve 3 interposed therebetween. At a lower end of the spindle 1, there is fixed a rotor case of the motor by means of a mounting screw 6. An outer ring of the upper bearing 2 is fixed into a central hole in a housing 9, whereas an outer ring of the lower bearing 2 is fitted into the central hole in the housing for relative movement in the axial direction. Between the outer ring of said lower bearing 2 and a step of the housing 9, there is interposed a pilot pressurization spring 4 for applying downward and upward biases to the outer ring of said lower bearing 2 and the housing 9, respectively.

The bearing structure shown in FIG. 8 is called a constant-pressure pilot pressurization system wherein the pilot pressurization spring 4 fluctuates depending upon the relative movement between the outer ring of the lower bearing 2 and the housing 9 so that a constant pilot pressure is always obtained.

In contrast to the conventional bearing structure shown in FIG. 8, such a sleeve 3 as employed therein is removed from the conventional bearing structure shown in FIG. 9. As illustrated in FIG. 9, an outer ring of a lower bearing 2 is fixed into a central hole in a housing 9, and between a rotor case 8 of a motor fixed to a lower end of a spindle 1 by means of a screw 6 and an inner ring of a lower bearing 2 there is interposed a pilot pressurization spring 7 for applying downward and upward biases to the rotor case 8 and the inner ring of the lower bearing 2, respectively.

The conventional bearing structure shown in FIG. 9 is referred to as a constant-position pilot pressurization system wherein the pilot pressurization spring 7, once positioned, is restrained from vertical fluctuation.

A problem with the bearing structure shown in FIG. 8 is that since the inner rings of the upper and lower bearings are fixed in place through the sleeve located on the inside of said inner rings, the accuracy of the sleeve has a considerable influence upon axial or planar vibrations.

In the bearing structure shown in FIG. 9, a central constricted portion of the rotor case is located in the inner rings of the bearings to determine the central position of the rotor case, so that when mounting the rotor case in place by means of a mounting screw, said constricted portion of the rotor case tends to come in contact with the inner rings of the bearings. When the constant-pressure pilot pressurization system is applied to this bearing structure, the resulting pilot pressurization tends to be unsatisfactory due to a frictional force occurring between said constricted portion of the rotor case and the inner rings of the bearings. This is the reason that applied to the bearing structure of FIG. 9 is the constant-position pilot pressurization system wherein both the inner and outer rings of the upper and lower bearings are fixed to the spindle and housing. According to this pilot pressurization system, the inner rings of the bearings have to be fixed to the outer rings thereof under a certain pilot pressure, and difficulty is encountered in providing a confirmation of whether or not the certain pilot pressure is applied, once the inner rings of the bearings have been fixed to the outer rings thereof. This structure is also lacking in reliability, since the pilot pressure is maintained by the bonding of the inner or outer rings of the bearings. For that reason, there is proposed a structure wherein a pilot pressurization member is located in opposition to the inner rings of bearings and an axial push is given to said pilot pressurization member with a jig to apply a pilot pressure to the bearings, whereupon said pilot pressurization member is fixed to a spindle with the use of a screw. However, this structure is troublesome to assemble and regulate, costs much and is disadvantageous for making the bearings thin.

SUMMARY OF THE INVENTION

The present invention has been accomplished to solve such problems of the prior art as mentioned above, and has for its object to provide a bearing structure for motors, which removes factors having an adverse influence upon axial or planar vibration characteristics, can dispense with bonding that is a factor responsible for a lowering of reliability and makes it easy to perform maintenance operations such as disassembling and repairment.

According to the present invention wherein a rotary output portion is mounted with respect to rolling bearings for relatively slidable movement in the axial direction, a pilot pressure is applied to the rolling bearings by biasing them in one direction. It is then unnecessary to make a bonding between the rolling bearings and the rotary output portion.

BRIEF DESCRIPTION OF THE DRAWINGS

Preferred embodiments of the present invention—illustrative of the best mode in which the applicant has contemplated applying the principles—are set forth in the following description and shown in the drawings, and are distinctly and particularly pointed out and recited in the appended claims.

In the drawings:

FIG. 5 is a plan view showing one pilot pressurization spring which may be used in the present invention, FIG. 6 is a longitudinally sectioned view showing another pilot pressurization spring which may be used in the present invention, FIG. 7 is a longitudinally sectioned view showing still another pilot pressurization spring which may be used in the present invention.

DETAILED DESCRIPTION OF THE PREFERRED EMBODIMENTS

Preferred embodiments of the bearing structure for motors according to the present invention will now be explained with reference to FIGS. 1 to 7.

Figure 1A:
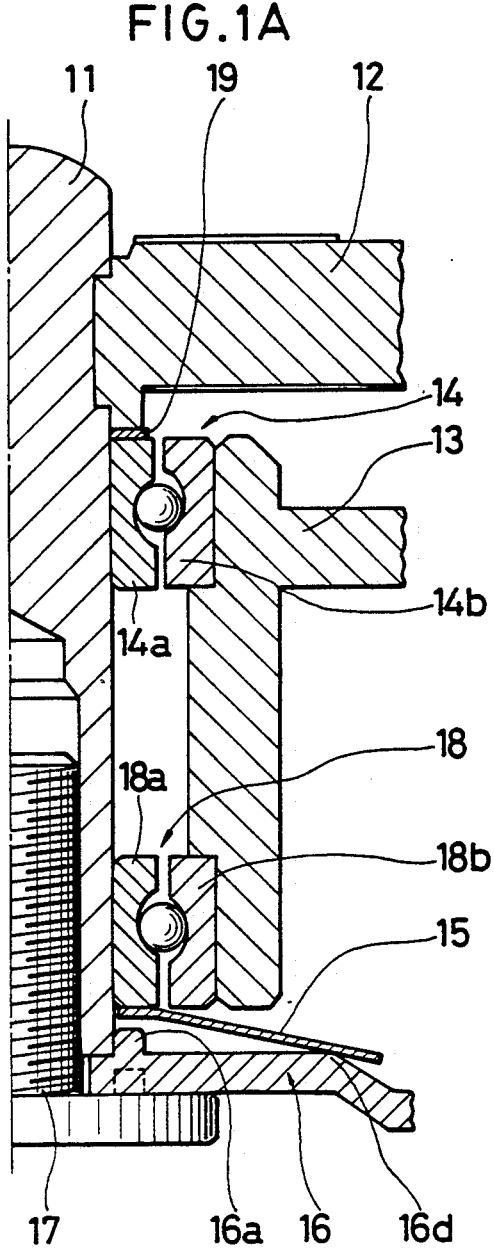
FIG. 1 is a longitudinally sectioned view of one embodiment of the bearing structure for motors according to the present invention.
Figure 1B:
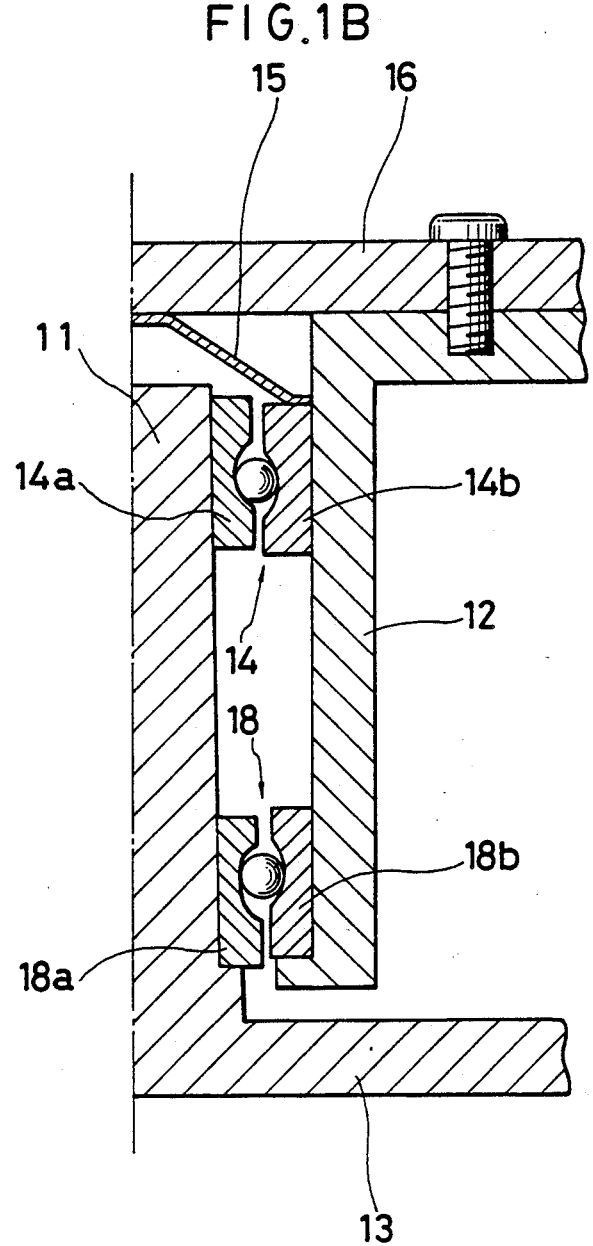
Figure 2:
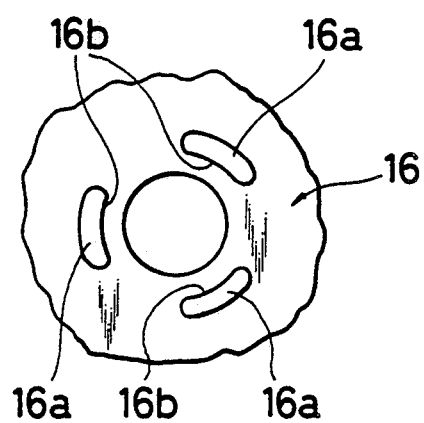
FIG. 2 is a plan view showing a part of that embodiment in the vicinity of a rotor case.
Figure 3:
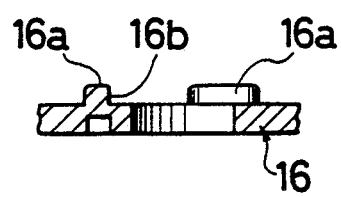
FIG. 3 is a longitudinally sectioned view of FIG. 2.
Figure 4:
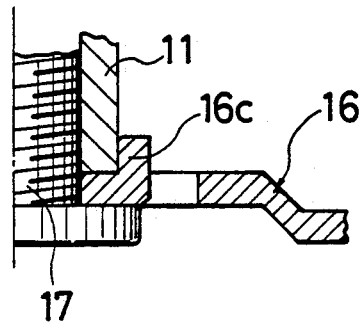
FIG. 4 is a longitudinally sectioned view showing part of a modification of the embodiment of FIG. 1 according to the present invention.
Figure 8:
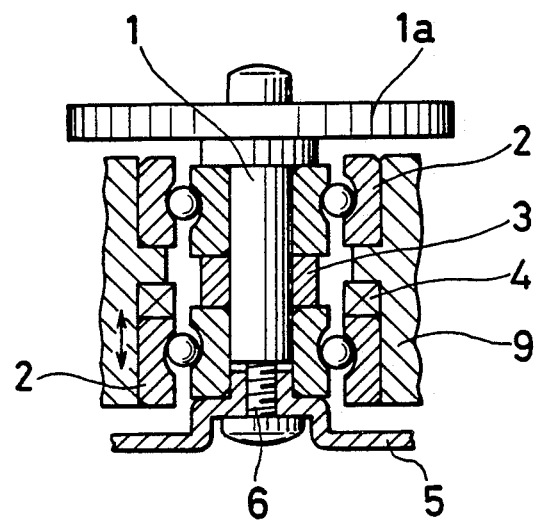
FIG. 8 is a longitudinally sectioned view illustrative of one conventional bearing structure for motors.
Figure 9:
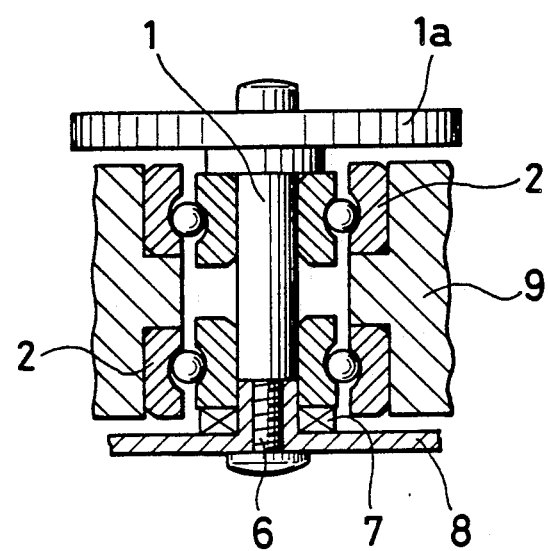
FIG. 9 is a longitudinally sectioned view illustrative of another conventional bearing structure for motors.

Referring now to FIG. 1, a rotary shaft of a motor generally shown at 11 defines a spindle in a disk drive system, etc., and is fixedly provided around its upper end portion with a hub base 12 which is rotationally driven with a disk placed thereon. Around the rotary shaft 11, there are fitted inner rings 14a and 18a of two rolling bearings 14 and 18, each comprising a ball bearing, for relatively slidable movement with respect to the axial direction. Outer rings 14b and 18b of the rolling bearings 14 and 18 are fitted and fixed in a central hole in a housing 13. Said outer rings 14b and 18b may be fixed in place by suitable means such as shrinkage fitting or bonding. A washer 19 is interposed between a lower end face of a boss portion of the hub base 12 and an upper end face of the inner ring 14a of the inner rolling bearing 14. Opposite to a lower end of the rotary shaft 11 is an upper edge of an inner periphery of the rotor case 16 of the motor. As illustrated in FIGS. 2 and 3, the rotor case 16 is provided with three positioning lugs 16a on a circle concentrical with its central hole by extrusion molding. An inner face 16b of each positioning lug 16a is in abutment with an outer edge of the lower end of the rotary shaft 11, thereby determining the relative centers of the rotary shaft 11 and the rotor case 16. The positioning lugs 16a may be provided entirely around the central hole 16. A mounting screw 17 is threadedly inserted through the rotary shaft 11 from its lower end for the integral fixation of the rotor case 16 to the rotary shaft 11 by a head thereof.

Between the lower end face of the inner ring 18a of the lower rolling bearing 18 and the rotor case 16, there is a suitable space or gap, in which a spring 15 is housed in an axially slidable manner. The spring 15 may be of any desired geometry. As illustrated in FIG. 5 by way of example, it may as a whole be of a geometry approximate to a dished spring and provided therearound with a suitable number of radial spring legs 15b through cut-outs 15a each of a suitable size, said spring legs 15b being bent obliquely from their roots. The spring legs 15b are then engaged on their inner edges with a lower end face of the inner ring 18a of the lower rolling bearing 18. With such an arrangement, the spring 15 is compressed and biased by both the engagement of the inner edge of the spring 15 with the inner ring 18a and the engagement of the spring legs 15b with a projecting edge 16d on the rotor case 16, whereby the rotor case 16 and the rotary shaft 11 made integral therewith are biased downwardly while the inner ring 18a of the bearing 18 is biased upwardly with respect to the outer ring 18b, so that a pilot pressure is applied in the thrust direction.

Although not illustrated, between the rotor case 16 and the housing 13, there are provided a field magnet and a drive coil. The rotor case 16 is rotationally driven by feeding power to the drive coil.

The foregoing embodiment is of the constant-pressure pilot pressurization system wherein a pilot pressure is applied to the inner ring of the bearing. When the rotor case 16 is fixed to the rotary shaft 11 by the mounting screw 17, the spring 15 is flexed depending upon the magnitude of the gap between the rotor case 16 and the inner ring 18a of the bearing 18, thereby applying a pilot pressure to the bearing. Thus, since it is unlikely that any frictional force may occur between the rotor case 16 and the bearing 18 due to the fact that they are spaced away from each other without any engagement, the pilot pressurization spring 15 is flexed in proportion to the pressure acting in the thrust direction, so that the spring 15 and the inner ring 18a of the bearing 18 can slide smoothly in the axial direction with respect to the rotary shaft 11. Consequently, with the thrusting pressure removed, the rotor case 16 is restored to its original position and subjected to the predetermined pilot pressure.

According to the foregoing embodiment, there is realized a constant-pressure pilot pressurization structure with the following effects, in which the rotary shaft 11 is positioned relative to the rotor case 16 by the positioning lugs 16a provided thereon and a pilot pressure is applied to the inner ring of the bearing without using any sleeve.

(1) Axial or planar vibrations can be limited.

(2) The reliability of pilot pressurization is improved, since the bonding of the bearing for the purpose of pilot pressurization can be dispensed with.

(3) Cutting or processing for the provision of a step for receiving a spring has been required for conventional rotor cases. However, the foregoing embodiment according to the present invention is more cost-effective, since it is then possible to make the rotor case 16 by pressing alone.

(4) Maintenance operations such as disassembling and repairment are facilitated, since the bonding of the bearing for the purpose of pilot pressurization can be dispensed with.

(5) After assembling, pilot pressurization can be easily confirmed by means such as the inspection of the resilience of the spring 15 by giving a push to the rotor case 16.

It is understood that as the spring for pilot pressurization, use may be made of a conically coiled spring 22 as shown in FIG. 6, a corrugated washer-form spring 23 as shown in FIG. 7 and other springs of various geometries.

It is also understood that the shape of the positioning means provided on the rotor case may optionally be designed depending upon the geometry of the spring for pilot pressurization. For instance, the rotor case 16 may by provided at its suitable place with a bend 16c to be used as positioning means with respect to the rotary shaft 11.

The positioning of the rotor case 16 relative to the rotary shaft 11 may also be achieved by forming a projection of a small diameter on the lower end portion of the rotary shaft 11 and fitting the central hole in the rotor case 16 onto the small-diameter projection.

Although the embodiment illustrated has been described as the bearing structure for a disc drive motor, the bearing structure for motors according to the present invention is not limited to the illustrated one, and may be applicable to every motor having its rotary output portion rotatably supported by rolling bearings.

According to the present invention wherein a rotary output portion is mounted with respect to a pair of rolling bearings for slidable movement in an axial direction, it is possible to apply a constant pilot pressure to the rolling bearings by giving an axial bias thereto. Thus, there is no need of either bonding the bearings to the the rotary output portion or using a sleeve, as carried out in the prior art. This makes it easy to perform maintenance operations such as disassembling and repairment, improves the reliability of pilot pressurization and limits axial or planar vibrations, thus resulting in improvements in accuracy. Another advantage of the present invention is that pilot pressurization is easily confirmable by means such as the inspection of the resilience of the spring by giving a push to the housing.

As many changes can be made to the embodiments of the invention without departing from the scope of the invention, it is intended that all material disclosed herein be interpreted as illustrative of the invention and not in a limiting sense.

What is claimed is:

1. A bearing structure for a motor comprising:
   a stationary housing having a linear passage extending therethrough;
   first and second ball bearings coaxially disposed within said passage and having inner and outer rings, said outer rings being captively secured to the surface of said passage;
   a unitary rotary shaft passing through said inner rings and slidably mounted to both of said inner rings;
   biasing means for biasing said inner rings in opposite axial directions along said shaft; and
   a rotor case fixedly attached to one end of said shaft proximate to said first bearing, said biasing means including first resilient means for urging the inner ring of said first bearing away from said rotor case.

2. The bearing structure of claim 1 wherein said first resilient means includes a conical coil spring disposed about said shaft between said first bearing and said rotor case with its small diameter end engaging the inner ring of said first bearing and its large diameter end engaging said rotor case.

3. The bearing structure of claim 1 including shoulder means affixed to the other end of said shaft configured for arresting engagement with the inner ring of said second bearing.

4. The bearing structure of claim 1 wherein said shaft is affixed to said rotor case by screw means.

5. The bearing structure of claim 1 including positioning means provided on said rotor case configured for engaging contact with the outer periphery of said shaft positionally aligning said shaft with respect to said rotor case.

* * * * *